# 3,530,172
PRODUCTION OF ESTERS FROM ISOBUTYLENE
Duncan Clark and Donald Wright, Norton-on-Tees, England, assignors to Imperial Chemical Industries Limited, London, England, a corporation of Great Britain
No Drawing. Filed Aug. 15, 1963, Ser. No. 302,451
Claims priority, application Great Britain, Aug. 24, 1962, 32,618/62
Int. Cl. C07c *67/04*
U.S. Cl. 260—497                                    16 Claims

ABSTRACT OF THE DISCLOSURE

A process for the production of methallyl esters of carboxylic acids which comprises the steps of contacting isobutene with a palladium salt and a carboxylate which is ionized under the reaction conditions in a carboxylic acid which is maintained at a temperature greater than 100° C. and at most 200° C.

---

This invention relates to the production of esters.

According to the present invention there is provided a process for the production of methallyl esters of carboxylic acids which comprises the step of contacting isobutene with a palladium salt and a carboxylate which is ionised under the reaction conditions in a carboxylic acid which is maintained at a temperature greater than 100° C. and at most 200° C.

By the term "methallyl esters" as used in his specification is meant esters derived from the alcohol $$CH_2=C(CH_3)CH_2OH$$

Palladium salts employed in the present process may be carboxylates, for example palladium acetate, but, particularly when the process is operated regeneratively as disclosed later, it is preferably a halide other than a fluoride. Palladous chloride is the most suitable. It is advantageous to use in conjunction with the palladium salt a halide, other than a fluoride, of an alkali metal, for example lithium chloride or sodium chloride.

The carboxylic acid or the carboxylate ionised under the reaction conditions and preferably both must correspond to the ester which it is desired to produce. Thus, when producing methallyl acetate, either acetic acid or an acetate ionised under the reaction conditions and preferably both must be present. Alkali metal carboxylates, for example lithium and sodium carboxylates, are particularly suitable. The carboxylate ionised under the reaction conditions may, if desired be formed in situ, for example by adding an alkali metal carbonate such as lithium carbonate or sodium carbonate to the reaction mixture already containing free carboxylic acid. Part at least of the carboxylate may be an alkaline earth metal carboxylate, such as a magnesium or a calcium salt.

A wide range of carboxylic acids and carboxylates ionised under the reaction conditions may be employed. For example, it is possible to use aliphatic monocarboxylic acids such as acetic acid, propionic acid and n-hexanoic acid; aliphatic dicarboxylic acids such as adipic acid; aromatic monocarboxylic acids such as benzoic acid; and aromatic dicarboxylic acids such as the phthalic acids. In all of these cases, a corresponding carboxylate ionised under the reaction conditions may be employed.

In the present process, metallic palladium is precipitated as the reaction proceeds. This may be prevented by operating in the presence of a redox system. This may be an inorganic compound such as a cupric or ferric salt, notably cupric acetate, cupric chloride or ferric chloride, or it may be an organic compound, for example para-benzoquinone, duroquinone, or 2-ethyl anthraquinone, or a mixture of two or more of these compounds. The said compounds undergo reduction during the process but can be reoxidised continuously by operating in the presence of gas containing molecular oxygen. Oxygen or a gas mixture containing it is preferably passed through the reaction zone during the course of reaction.

In general, operation at about 150° C. is preferable. The reaction may be carried out at atmospheric pressure or at an overall elevated pressure of up to, for example, 10 atmospheres gauge.

There is a tendency in the present reaction for tertiary butyl esters to be formed simultaneously with the methallyl esters. This tendency is decreased by an increase in the ratio of palladium concentration to isobutene partial pressure. Thus, when the reaction is carried out at elevated overall pressures, where the formation of tertiary butyl esters is likely to be most marked, it is advantageous for the gas mixture to contain an inert gas, for example nitrogen, as diluent. Also, in general, it is advisable for the concentration of the palladium salt to be 0.1 to 2.0 molar, preferably 0.15 to 0.30 molar.

When the reaction is carried out regeneratively, water is formed in the reaction zone. Normally, when operating at an elevated pressure of up to 5 atmospheres, no buildup of water occurs in the reaction mixture, as water is removed continuously in the exit gases. If operation is carried out at a higher pressure, the water content in the reaction mixture must not reach a level at which it causes a deleterious amount of ester hydrolysis and it may be removed continuously or at intervals, for example by distillation.

The esters produced by the present process may be used in the production of polymers and as intermediates in the synthesis of other organic compounds.

EXAMPLE 1

This example illustrates operation under non-regenerative conditions.

A solution of palladous chloride (0.1 molar) and sodium acetate (0.5 molar) in acetic acid was refluxed for two hours under an atmosphere of isobutene. At the end of this time, further sodium acetate was added to give a 2.5 molar solution. The liquid was refluxed for a further four hours and at the end of this time the product was analysed. Methallyl acetate was obtained in a 50% yield based on the amount of palladium employed.

EXAMPLE 2

This example illustrates operation using a redox system (cupric chloride) which is not however regenerated during the course of reaction.

A solution of palladous chloride (0.05 molar), lithium acetate (1.5 molar) and cupric chloride (0.5 molar) in acetic acid was refluxed for four hours under an atmosphere of isobutene. The liquid was cooled and filtered and methallyl acetate was extracted from the filtrate using light petroleum. The yield of methallyl acetate was 160% based on the amount of palladium employed, showing that the reaction had been carried out regeneratively in that metallic palladium, which would otherwise have been precipitated, had been reoxidized by the cupric chloride and used again in the process.

EXAMPLE 3

Solutions were made up for use in three runs having the compositions as set out in the table below:

| Run Number | 1 and 2 | 3 |
|---|---|---|
| Palladous chloride, mole | 0.10 | 0.15 |
| Lithium chloride, mole | 0.2 | 0.4 |
| Lithium acetate, mole | 0.4 | 0.8 |
| Cupric acetate, mole | 0.2 | 0.4 |
| Acetic acid, litre | 1 | 1 |

In Run No. 1, a gas mixture was employed, the composition by volume of which was 90% isobutene and 10% oxygen, while in Runs No. 2 and 3 the gas mixture contained by volume 20% isobutene; 15% oxygen; 65% nitrogen. In each run, the reaction liquid was maintained at a temperature of 150° C. and the total pressure was 75 lbs. per square inch. A rapid gas flow (400 litres per hour) was employed and the esters produced were recovered from the acetic acid which condensed from the exit gases. The results given in the following table were obtained.

| Run Number: | Duration (hours) | t-Butyl acetate (grams) | Methallyl acetate (grams) | Cycles |
|---|---|---|---|---|
| 1 | 4 | 68 | 43 | 3.7 |
| 2 | 3.5 | 19 | 36 | 3.1 |
| 3 | 4 | 26 | 105 | 6.3 |

The term "cycles" as used in the table above denotes the ratio of the weight of product to the weight which would have been obtained had the palladous catalyst been consumed in a stoichiometric reaction.

What is claimed is:

1. A process for the production of a methallyl ester of a carboxylic acid selected from the group consisting of lower alkanoic, adipic, benzoic and phthalic acids, said process comprising the step of contacting isobutene with a palladium salt and a carboxylate of said acids which is ionized under the reaction conditions in one of said carboxylic acids maintained at a temperature greater than 100° C. and at most 200° C., said carboxylate being selected from the group consisting of alkali metal and alkaline earth metal carboxylates.

2. A process as claimed in claim 1 in which the palladium salt is selected from the group consisting of palladous chloride, palladous bromide and palladous iodide.

3. A process as claimed in claim 1 in which the palladium salt is a carboxylate.

4. A process as claimed in claim 1 in which the concentration of palladous salt employed lies in the range of 0.1 to 2.0 molar.

5. A process as claimed in claim 1 in which the reaction is carried out in the presence of a chloride selected from the group consisting of lithium chloride and sodium chloride.

6. A process as claimed in claim 1 in which the carboxylic acid and the carboxylate ionised under the reaction conditions both correspond to the ester which it is desired to produce.

7. A process as claimed in claim 1 in which the carboxylate is an alkali metal carboxylate selected from the group consisting of lithium and sodium carboxylates.

8. A process as claimed in claim 1 in which part at least of the carboxylate is an alkaline earth metal carboxylate.

9. A process as claimed in claim 1 in which the reaction is carried out in the presence of an inorganic redox system selected from the group consisting of cupric acetate, cupric chloride and ferric chloride.

10. A process as claimed in claim 1 in which the reaction is carried out in the presence of an organic redox system selected from the group consisting of parabenzoquinone, duroquinone and 2-ethylanthraquinone.

11. A process as claimed in claim 1 in which the reaction is carried out in the presence of a redox system and in the presence of a gas containing molecular oxygen.

12. A process as claimed in claim 1 in which the temperature is in the vicinity of 150° C.

13. A process as claimed in claim 1 in which the pressure is substantially atmospheric.

14. A process as claimed in claim 1 in which an overall elevated pressure of at most 10 atmospheres is used, the gas mixture containing an inert gas as diluent.

15. A process as claimed in claim 1 in which the reaction is carried out in the presence of a redox system and of molecular oxygen, water formed during the reaction being removed as the reaction proceeds.

16. A process for preparing an allyl ester which comprises reacting a $C_4$ tertiary aliphatic olefin with sodium acetate in the presence of palladous chloride and anhydrous acetic acid at a temperature of 100–150° C. for a time sufficient to recover an exclusively allylic ester.

References Cited

UNITED STATES PATENTS 3,221,045  11/1965  McKeon et al. _____ 260—497

FOREIGN PATENTS 615,596  9/1962  Belguim.

LORRAINE A. WEINBERGER, Primary Examiner

V. GARNER, Assistant Examiner

U.S. Cl. X.R.

260—475, 476, 485